United States Patent Office 3,096,333
Patented July 2, 1963

---

3,096,333
REACTION OF 4 - AMINO - 1,8 - NAPHTHALIMIDES AND AROMATIC DIISOCYANATES, AND RESULTING PRODUCTS
Robert C. Wilson, Cranford, N.J., and Harlan B. Freyermuth, Easton, Pa., assignors to General Aniline & Film Corporation, New York, N.Y., a corporation of Delaware
No Drawing. Filed Nov. 21, 1960, Ser. No. 70,413
14 Claims. (Cl. 260—281)

This invention relates to a series of novel fluorescent dyes and to fluorescent dyed foamed resin compositions in which the dye is chemically bound to the resin.

In general this invention relates to a novel series of dyestuffs having the general structure

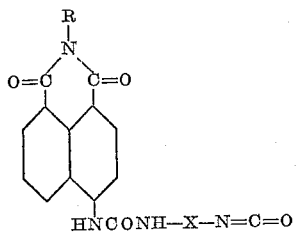

wherein X is the aromatic moiety of an aromatic diisocyanate and R is H, alkyl (e.g. methyl, ethyl, propyl, butyl, isobutyl, amyl, hexyl, octyl, isooctyl, decyl, dodecyl, tetradecyl, octadecyl, and the like), hydroxyalkyl (e.g. hydroxymethyl, hydroxyethyl, hydroxypropyl, and the like), carboxyalkyl (e.g. carboxymethyl, carboxyethyl, and the like), cycloalkyl (e.g. cyclopentyl, cyclohexyl, and the like), aralkyl (e.g. benzyl, menaphthyl, and the like), aryl (e.g. phenyl, tolyl, naphthyl, and the like), alkoxyaryl (e.g. anisyl and the like), and hydroxy aryl (e.g. salicyl and the like).

More particularly, this invention relates to a novel series of fluorescent dyes which are N-substituted ureylene derivatives of 4-amino-1,8-naphthalimides and have the general formula

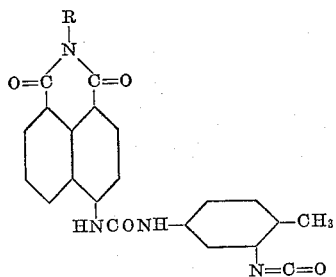

wherein R is the same as defined above.

The dyes of the above formula are produced by heating the corresponding 4-amino-1,8-naphthalimide to a temperature of about 100–110° C. with an excess of an aromatic diisocyanate, e.g. 2,4-tolylene diisocyanate or with a mixture containing about 80% of the 2,4- and 20% of the 2,6-isomers. Since the isocyanate group in the 4-position is more reactive than that in the 2-position, and since an excess of the diisocyanate is used, the isocyanate group in the 4-position reacts with the 4-amino group of the naphthalimide to produce a ureylene compound belonging to the class indicated by the general formula above.

The above described process can be represented by the following equation, in which R has the same meaning as above:

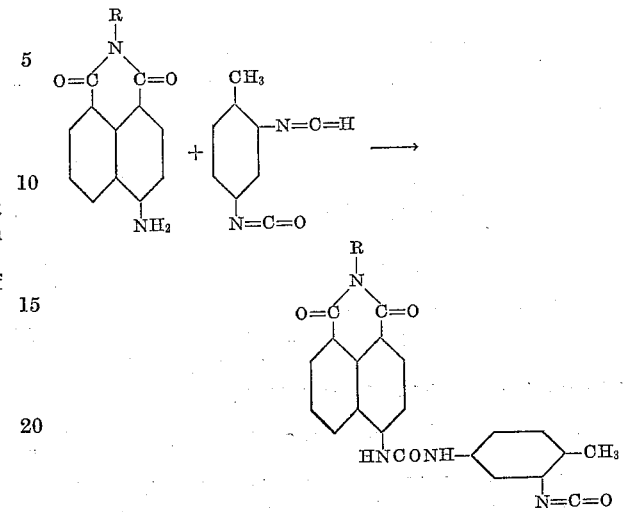

The tolylene diisocyanate is a known material; while the 4-amino-1,8-naphthalimide reacted therewith is produced according to the method disclosed in U.S. Patent No. 2,600,080.

The concentration of amino naphthalimide in the tolylene diisocyanate may be varied from a few tenths of a percent to several percent, depending on the strength of dyeing desired.

After the amino naphthalimide has reacted with the diisocyanate the solution containing the dye dissolved in the excess diisocyanate is cooled to room temperature.

Another aspect of the invention relates to the use of the above-described fluorescent dye to produce fluorescent dyed foamed polyurethane resins. Since the dyes contain an unreacted isocyanate group which is reactive with the hydroxyl groups of the polyesters and polyethers used in the formulations for the preparation of foamed polyurethane resins, it is possible in accordance with our invention to produce a fluorescent dyed foamed polyurethane resin in which the dye is chemically bound to the hydroxylated polyester or polyether through a ureylene linkage of the dye. In this way a permanence of color is insured.

In general, the process involves first forming the dye, as described above, and then, after the reaction mixture has cooled, foaming it with a precondensed polyester or polyether resin formulation containing, in addition to the resin, a tertiary amine catalyst, a surface active agent and water. While the excess diisocyanate will react with the hydroxylated resin the dye itself, containing only one isocyanate radical, requires the presence of water for the reaction.

After foaming, the polyurethane resin is cured by heating for four hours at a temperature of 85–90° C.

The following examples are illustrative of the invention. However, it will readily be appreciated by those skilled in the art that other 4-amino-1,8-naphthalimides and other diisocyanates can be substituted for the specific reactants described without departing from the spirit of the invention.

*Example 1*

0.165 gram of N-m-xylyl-4-amino-1,8-naphthalimide was added to 8.15 grams of tolylene diisocyanate (containing approximately 80% of the 2,4- and 20% of the 2,6-isomers) and the mixture heated for 5 minutes to 100–110° C. until a clear yellow fluorescent solution was obtained. The solution was cooled to room temperature and diluted with 100 cc. of petroleum ether. A yellow precipitate formed which was filtered, washed repeatedly on the filter with petroleum ether to remove unreacted diisocyanate, and then dried. The yellow dye melted at 192–195° C. and had the formula

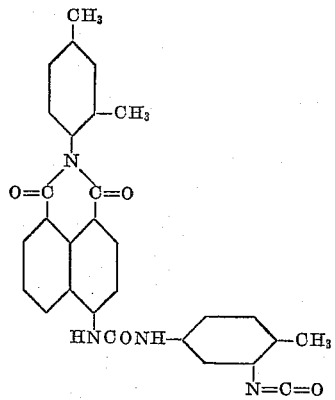

The starting material melts at 265° C.

*Example 2*

0.26 gram of N-m-xylyl-4-amino-1,8-naphthalimide was added to 12.3 grams of tolylene diisocyanate (containing approximately 80% of the 2,4- and 20% of the 2,6-isomers). The mixture was heated to 100–110° C. for 5 minutes during which time the naphthalimide reacted and went into solution, producing a bright yellow fluorescence. When all of the naphthalimide had dissolved the solution was cooled to room temperature and added to 40 grams of a precondensed polyester composition composed of 2,000 parts by weight of a polyester resin made from adipic acid and ethylene glycol, 90 parts of distilled water, 7.6 parts of diethylethanolamine, and 10 parts of the surface active condensation product of castor oil and 40 moles of ethylene oxide per mole of castor oil. A brilliant yellow fluorescent foamed rubber-like polyurethane resin was obtained which was cured by heating at 85–90° C. for 4 hours.

*Example 3*

Example 2 was repeated except that 40 grams of a polypropylene glycol polyether (molecular weight, 2025) was substituted for the polyester resin. As in Example 2, a brilliant fluorescent yellow polyurethane foamed resin was obtained.

Although, in the foregoing examples, the fluorescent dye was produced by reacting a 4-amino-1,8-naphthalimide with tolylene diisocyanate, other diisocyanates can be substituted. Thus, in place of tolylene diisocyanate, we can use 3,3'-dimethyl-4,4'-biphenylene diisocyanate, 3,3'-dimethoxy-4,4'-biphenylene diisocyanate, 4,4'-diphenylmethane diisocyanate, naphthalene diisocyanates, and the like. The resulting dyestuffs have the following formulas, respectively:

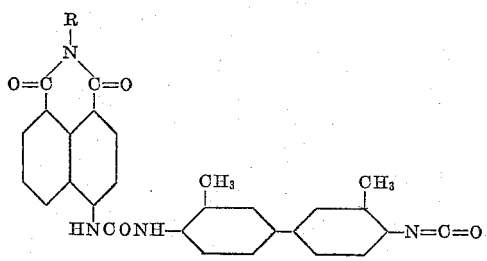

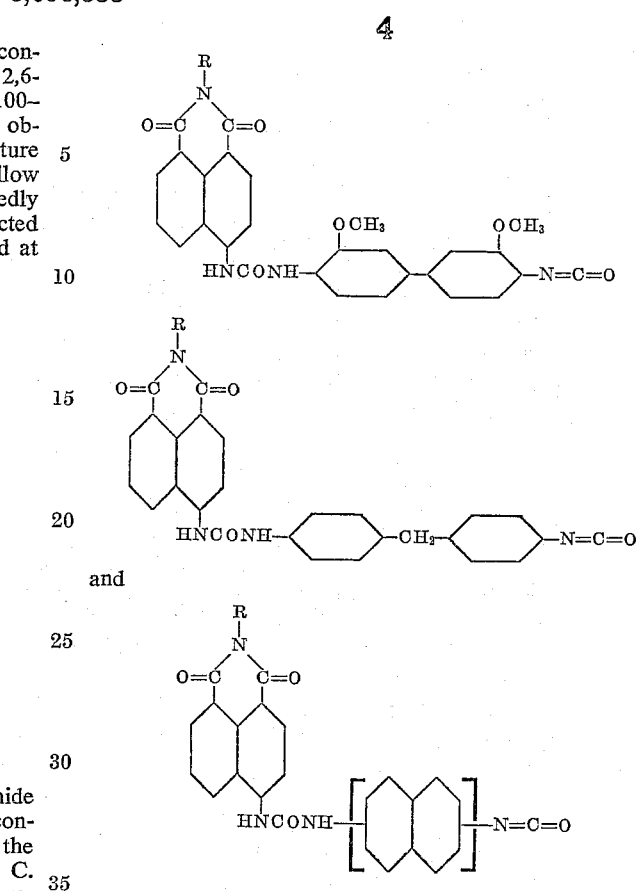

wherein R is the same as defined above. It will, of course, be understood from the naming of the various compounds employed that the rings in the structural formulas shown in the specification and claims are intended to represent benzene nuclei.

It is to be understood that the foregoing detailed description is given merely by way of illustration and that many variations may be made therein without departing from the spirit of this invention.

What is claimed is:

1. The process for producing a fluorescent dyestuff which comprises reacting a 4-amino naphthalimide having the formula

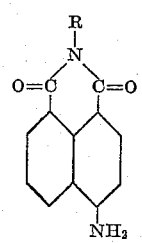

where R is a member of the group consisting of H, alkyl, having from 1 to about 18 carbon atoms, lower hydroxyalkyl, lower carboxyalkyl, lower cycloalkyl, aralkyl wherein the alkyl is a lower alkyl and the aryl contains no more than 2 benzene nuclei, aryl containing no more than two benzene nuclei, and substituted derivatives of said aryl wherein the substituted substituent is selected from the group consisting of lower alkyl, lower alkoxy, and hydroxyl, with a homocyclic aromatic diisocyanate having no more than 2 benzene nuclei.

2. The process of claim 1 wherein the aromatic diisocyanate is tolylene-2,4-diisocyanate.

3. The process of claim 1 wherein the aromatic diisocyanate is 3,3'-dimethyl-4,4'-biphenylene diisocyanate.

4. The process of claim 1 wherein the aromatic diisocyanate is 3,3'-dimethoxy-4,4'-biphenylene diisocyanate.

5. The process of claim 1 wherein the aromatic diisocyanate is 4,4'-diphenylmethane diisocyanate.

6. The process of claim 1 wherein the aromatic diisocyanate is a naphthalenediisocyanate.

7. The process of claim 1 wherein R is m-xylyl and the aromatic diisocyanate is tolylene 2,4-diisocyanate.

8. A dyestuff having the formula:

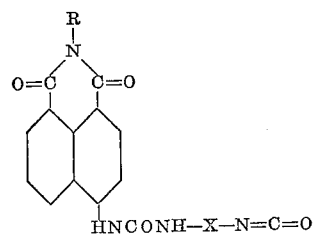

wherein R is a member of the group consisting of H, alkyl having from 1 to about 18 carbon atoms, lower hydroxyalkyl, lower carboxyalkyl, lower cycloalkyl, aralkyl wherein the alkyl is a lower alkyl and the aryl contains no more than 2 benzene nuclei, aryl containing no more than two benzene nuclei, and substituted derivatives of said aryl wherein the substituted substituent is selected from the group consisting of lower alkyl, lower alkoxy, and hydroxyl, and X is the aromatic moiety of a homocyclic aromatic diisocyanate containing no more than 2 benzene nuclei, nuclei of said moiety having substituents thereon selected from the group consisting of H, lower alkyl and lower alkoxy.

9. A dyestuff having the formula

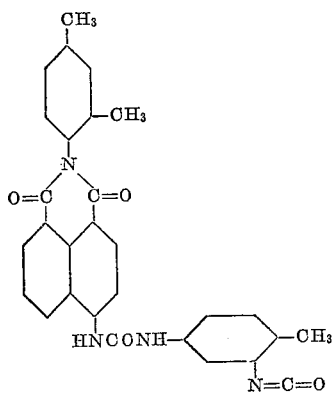

10. A dyestuff having the formula:

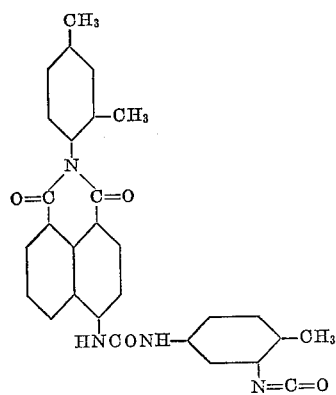

11. A dyestuff having the formula:

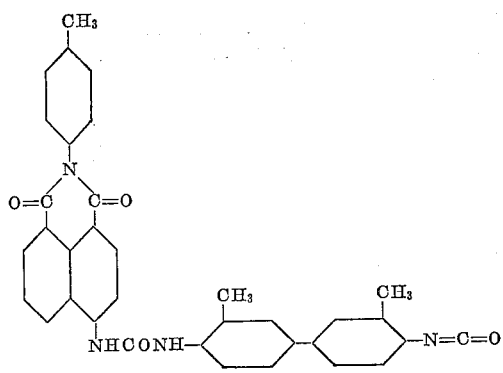

12. A dyestuff having the formula:

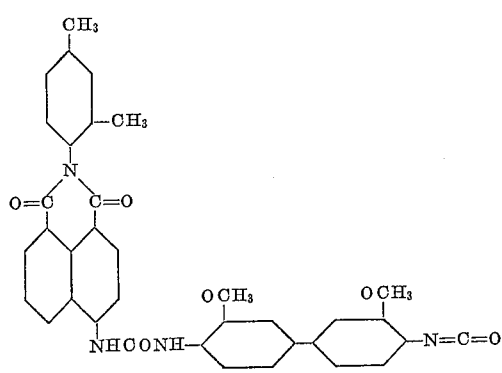

13. A dyestuff having the formula:

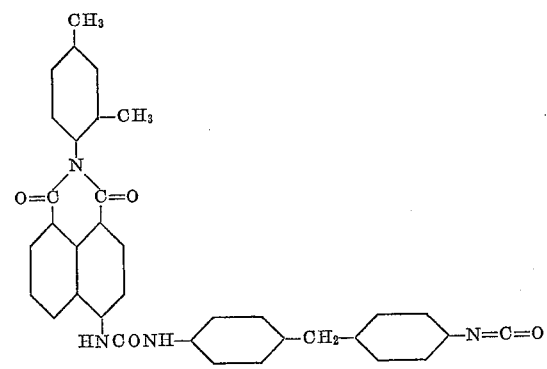

14. A dyestuff having the formula:

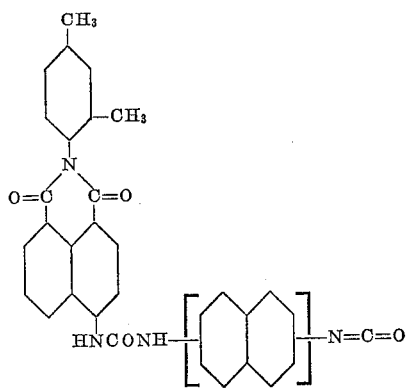

(References on following page)

References Cited in the file of this patent

UNITED STATES PATENTS

| | | |
|---|---|---|
| 2,600,080 | Shrader | June 10, 1952 |
| 2,715,126 | Mulvaney et al. | Aug. 9, 1955 |
| 2,725,385 | Seeger et al. | Nov. 29, 1955 |
| 2,927,905 | Eckert | Mar. 8, 1960 |
| 2,949,431 | Britain | Aug. 16, 1960 |

FOREIGN PATENTS

| | | |
|---|---|---|
| 469,018 | Canada | Oct. 31, 1950 |
| 1,037,120 | Germany | Aug. 21, 1958 |